(12) United States Patent
Ahn et al.

(10) Patent No.: US 11,908,627 B2
(45) Date of Patent: Feb. 20, 2024

(54) MULTILAYER ELECTRONIC COMPONENT

(71) Applicant: SAMSUNG ELECTRO-MECHANICS CO., LTD., Suwon-si (KR)

(72) Inventors: Young Ghyu Ahn, Suwon-si (KR); Soo Hwan Son, Suwon-si (KR); Young Key Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 70 days.

(21) Appl. No.: 17/845,180

(22) Filed: Jun. 21, 2022

(65) Prior Publication Data

US 2023/0326677 A1 Oct. 12, 2023

(30) Foreign Application Priority Data

Mar. 24, 2022 (KR) ........................ 10-2022-0036552

(51) Int. Cl.
*H01G 4/30* (2006.01)
*H01G 4/232* (2006.01)
*H01G 4/12* (2006.01)
*H01G 2/06* (2006.01)
*H01G 4/012* (2006.01)

(52) U.S. Cl.
CPC ............... *H01G 4/30* (2013.01); *H01G 2/065* (2013.01); *H01G 4/012* (2013.01); *H01G 4/12* (2013.01); *H01G 4/232* (2013.01)

(58) Field of Classification Search
None
See application file for complete search history.

(56) References Cited

U.S. PATENT DOCUMENTS

| | | | | |
|---|---|---|---|---|
| 9,208,949 B2 * | 12/2015 | Ahn | ................... | H01G 4/224 |
| 9,373,446 B2 * | 6/2016 | Park | .................... | H01G 2/06 |
| 9,974,183 B2 * | 5/2018 | Chae | .................... | H01G 4/30 |
| 10,236,124 B2 * | 3/2019 | Masunari | ............. | H05K 3/3442 |
| 10,714,261 B2 * | 7/2020 | Harada | .................... | H01G 4/30 |
| 10,957,486 B2 * | 3/2021 | Yoon | .................... | H01G 2/065 |
| 11,587,735 B2 * | 2/2023 | Park | .................... | H01G 4/30 |
| 11,626,248 B2 * | 4/2023 | Kurosu | ................. | H01G 4/30 |
| | | | | 361/321.2 |
| 2014/0116766 A1 * | 5/2014 | Jeon | .................... | H05K 3/3442 |
| | | | | 361/321.2 |

(Continued)

FOREIGN PATENT DOCUMENTS

CN 108155006 B * 12/2019 ............... H01G 2/06
JP 2015-228481 A 12/2015

(Continued)

*Primary Examiner* — Dion R. Ferguson
(74) *Attorney, Agent, or Firm* — Morgan, Lewis & Bockius LLP

(57) ABSTRACT

A multilayer electronic component includes a body including a dielectric layer and an internal electrode, an external electrode disposed outside the body, and an insulating layer disposed on the external electrode. The external electrode is disposed to cover an exposed surface of an outermost surface of the electrode layer, and is formed to have a thickness, equal to or less than a thickness of the body, and the insulating layer is disposed to cover an end of the external electrode, to improve moisture resistance reliability.

24 Claims, 8 Drawing Sheets

(56) References Cited

U.S. PATENT DOCUMENTS

| | | | |
|---|---|---|---|
| 2014/0196936 A1* | 7/2014 | Hong | H01G 4/2325 |
| | | | 174/257 |
| 2015/0325377 A1 | 11/2015 | Takeuchi et al. | |
| 2017/0250028 A1 | 8/2017 | Makino | |
| 2017/0256359 A1* | 9/2017 | Masunari | H01G 4/005 |
| 2017/0278634 A1* | 9/2017 | Kato | H01G 4/0085 |
| 2017/0367187 A1 | 12/2017 | Chae et al. | |
| 2019/0355518 A1* | 11/2019 | Harada | H01G 4/30 |
| 2021/0020377 A1* | 1/2021 | Kurosu | H01G 4/012 |
| 2023/0215637 A1* | 7/2023 | Ahn | H01G 4/12 |
| | | | 361/301.4 |

FOREIGN PATENT DOCUMENTS

| | | |
|---|---|---|
| KR | 10-1548793 B1 | 8/2015 |
| KR | 10-2017-0101121 A | 9/2017 |
| KR | 10-2017-0113108 A | 10/2017 |
| KR | 10-2017-0143275 A | 12/2017 |

\* cited by examiner

MULTILAYER ELECTRONIC COMPONENT

CROSS-REFERENCE TO RELATED APPLICATION(S)

This application claims benefit of priority to Korean Patent Application No. 10-2022-0036552 filed on Mar. 24, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a type of multilayer electronic component, may be a chip type capacitor mounted on the printed circuit boards of various types of electronic products such as image display devices including liquid crystal displays (LCDs), plasma display panels (PDPs), and the like, and computers, smartphones, mobile phones, and the like, serving to charge or discharge electricity therein or therefrom. In addition, as the scope of application of capacitors becomes wider, demand for miniaturization, high capacitance, and high reliability is gradually expanding.

Such a multilayer ceramic capacitor may be used as a component of various electronic devices due to its relatively small size, relatively high capacitance, and relative ease of mounting. As various electronic devices such as computers, mobile devices, and the like are miniaturized and have high output, demand for decreasing the size and increasing the capacitance of multilayer ceramic capacitors is increasing. In order to decrease the size and increase the capacitance of the multilayer ceramic capacitor, it is necessary to mount as many components as possible within a limited area of the substrate. For this purpose, it is necessary to minimize the mounting space.

In order to minimize the mounting space, research on a structure increasing the effective volume by modifying the structure of the external electrode and reducing the specific gravity of the portion that does not contribute to capacitance formation is in progress. Accordingly, multilayer ceramic electronic components having an L-shaped electrode or a lower electrode structure as in Korean Patent publication No. 10-2017-0143275 have been developed.

However, in the case of an L-shaped electrode, the junction between the external electrode and the ceramic body may be easily separated due to external impacts, and the plating solution or external moisture may pass through the separated gap, to weaken reliability of the product. Accordingly, there is a need for a method that may protect the multilayer electronic components from external moisture penetration.

SUMMARY

An aspect of the present disclosure is to provide a multilayer electronic component preventing external moisture penetration and the like to have improved reliability.

An aspect of the present disclosure is to provide a multilayer electronic component alleviating external impacts to have improved impact resistance.

An aspect of the present disclosure is to provide a multilayer electronic component in which a mounting space is decreased.

However, problems to be solved by the present disclosure are not limited to the above, and will be more easily understood in the process of describing specific embodiments of the present disclosure.

According to an aspect of the present disclosure, a multilayer electronic component includes a body including a plurality of dielectric layers and first and second internal electrodes alternately disposed in a first direction with the plurality of dielectric layers interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and connected to the first internal electrodes, and a first bend portion extending from the first connection portion onto a portion of the first surface; a second external electrode including a second connection portion disposed on the fourth surface and connected to the second internal electrodes, and a second bend portion extending from the second connection portion onto a portion of the first surface; a first insulating layer disposed on the first connection portion; and a second insulating layer disposed on the second connection portion. The first and second connection portions are arranged to cover the first and second internal electrodes, respectively, and the first and second insulating layers are arranged to cover the first and second connection portions, respectively, and the multilayer electronic component satisfies the following relationship: $Ti < Tc < Ts \leq T$, where T denotes an average distance of the body in the first direction, Ti denotes an average distance, in the first direction, from the first surface to an internal electrode disposed closest to the second surface, among the first and second internal electrodes, Tc denotes an average distance, in the first direction, from the first surface to one ends of the first and second connection portions in the first direction, and Ts denotes an average distance, in the first direction, from the first surface to one ends of the first and second insulating layers in the first direction.

According to another aspect of the present disclosure, a multilayer electronic component includes a body including a plurality of dielectric layers and first and second internal electrodes alternately disposed in a first direction with the plurality of dielectric layers interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and connected to the first internal electrodes, and a first bend portion extending from the first connection portion to a portion of the first surface; a second external electrode including a second connection portion disposed on the fourth surface and connected to the second internal electrodes, and a second bend portion extending from the second connection portion to a portion of the first surface; a first insulating layer disposed on the first connection portion; and a second insulating layer disposed on the second connection portion, wherein the first and second connection portions are arranged to cover the first and second internal electrodes, respectively, and the first and second insulating layers are arranged to cover the first and second connection portions, respectively, and the multilayer electronic component satisfies the following relationships: Ti<Tc<Ts≤T and Wi<Wc<Ws≤W where T denotes an average distance of the body in the first direction, W denotes an average distance of the body in the second direction, Ti denotes an average distance, in the first direction, from the first surface to an internal electrode disposed closest to the second surface, among the first and second internal electrodes, Wi denotes an average distance of each of the first and second internal electrodes in the second direction, Tc denotes an average distance, in the first direction, from the first surface to one ends of the first and second connection portions in the first direction, Wc denotes an average distance of each of the first and second connection portions in the second direction, Ts denotes an average distance, in the first direction, from the first surface to one ends of the first and second insulating layers in the first direction, and Ws denotes an average distance of each of the first and second insulating layers in the second direction.

According to another aspect of the present disclosure, a multilayer electronic component includes a body including a plurality of dielectric layers and first and second internal electrodes alternately disposed in a first direction with the plurality of dielectric layers interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and connected to the first internal electrodes, and a first bend portion extending from the first connection portion to a portion of the first surface; and a second external electrode including a second connection portion disposed on the fourth surface and connected to the second internal electrodes, and a second bend portion extending from the second connection portion to a portion of the first surface. The first and second connection portions covers the first and second internal electrodes, respectively. The first connection portion is spaced apart from edges of the third surface respectively connected to the second, fifth, and sixth surfaces. The first connection portion has a width in the second direction greater than an average width of the first internal electrodes in the second direction.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
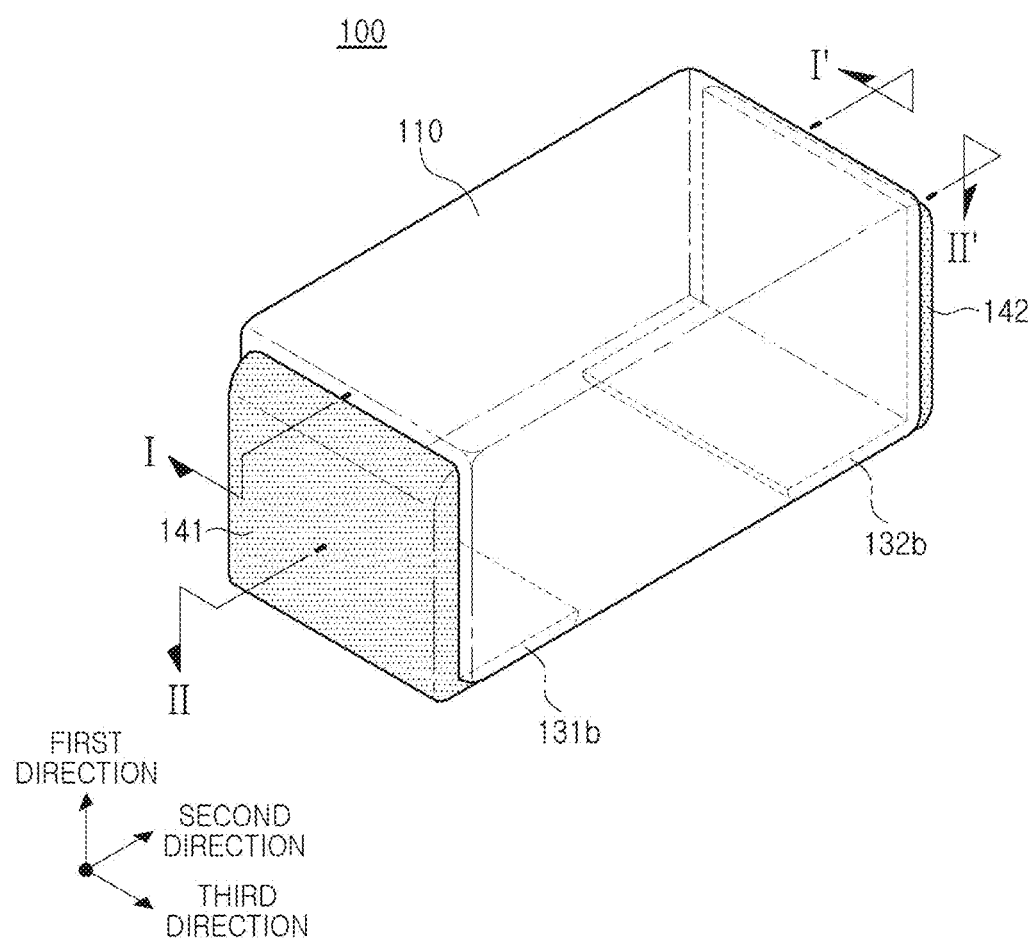
FIG. 1 schematically illustrates a perspective view of a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, a first direction may be defined as a stacking direction or a thickness (T) direction, a second direction may be defined as a length (L) direction, and a third direction may be defined as a width (W) direction.

FIG. 1 schematically illustrates a perspective view of a multilayer electronic component according to an embodiment of the present disclosure.

Figure 2:
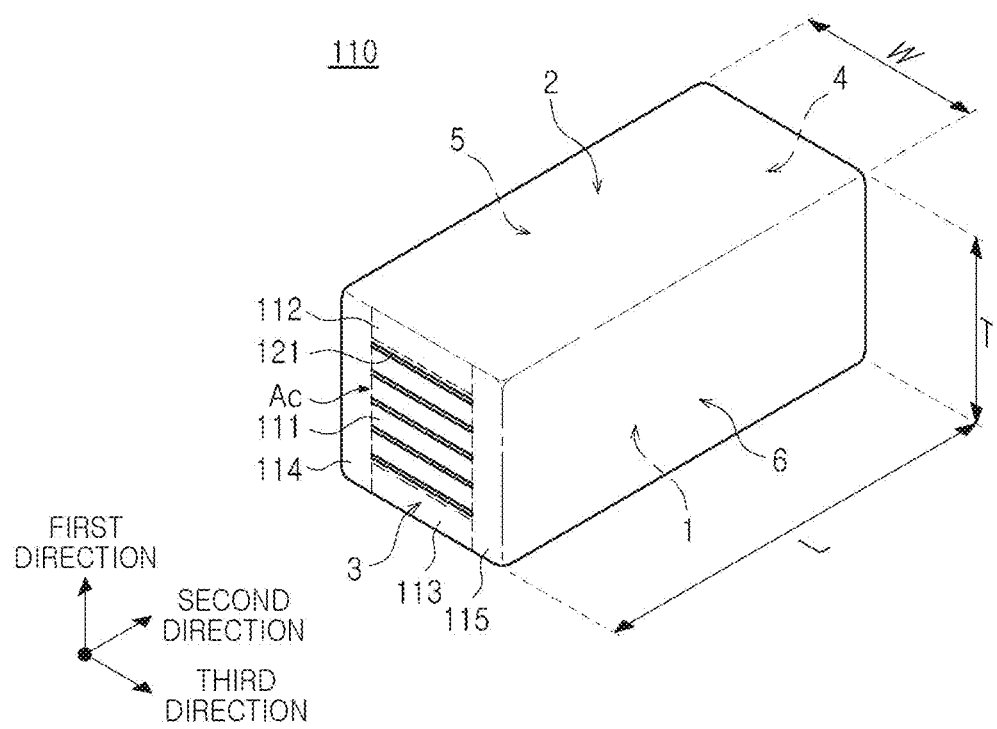
FIG. 2 schematically illustrates a perspective view of a body of the multilayer electronic component of FIG. 1.

FIG. 2 schematically illustrates a perspective view of a body of the multilayer electronic component of FIG. 1.

Figure 3:
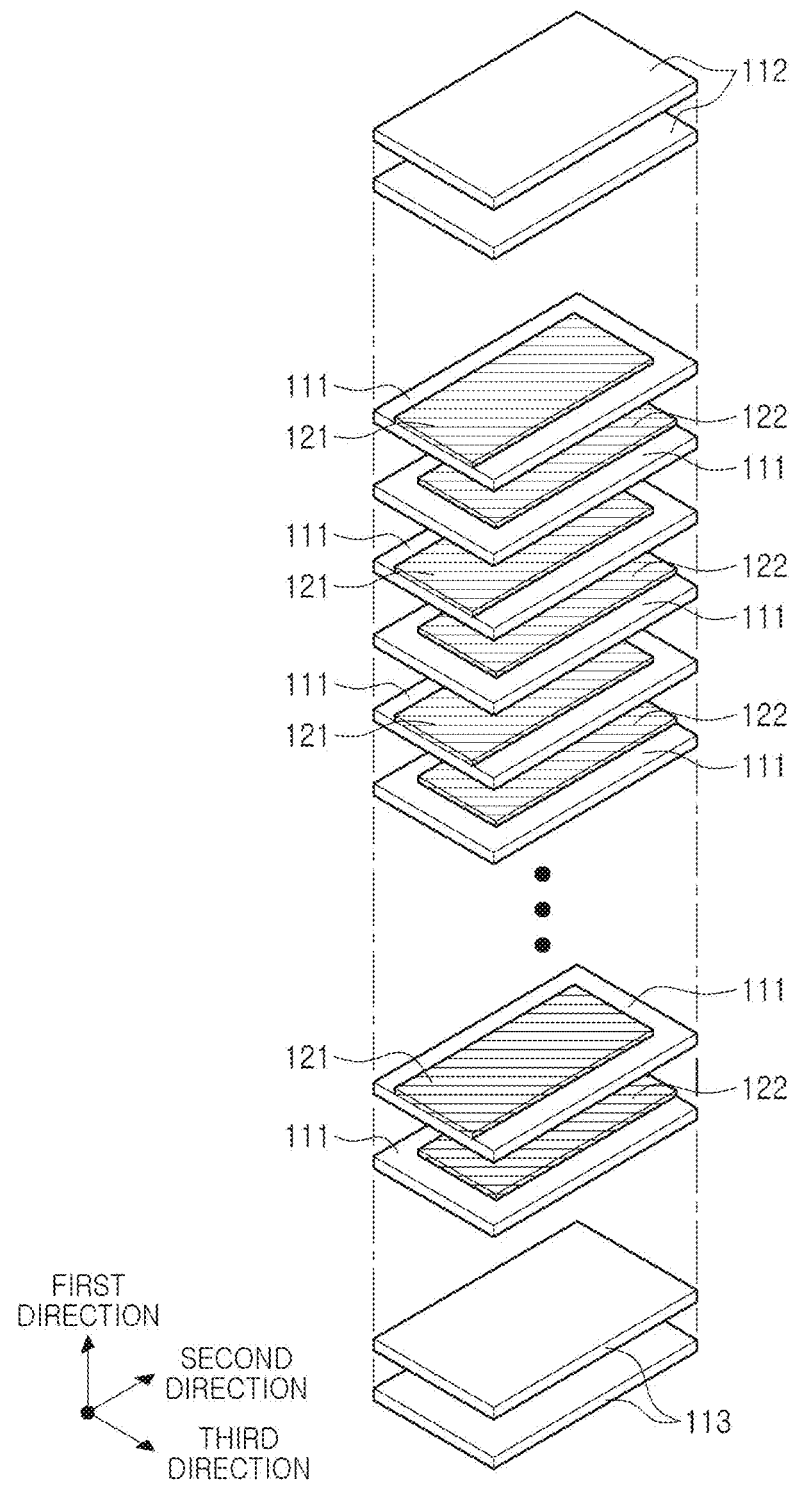
FIG. 3 is an exploded perspective view schematically illustrating the exploded body of FIG. 2.

FIG. 3 is an exploded perspective view schematically illustrating the exploded body of FIG. 2.

Figure 4:
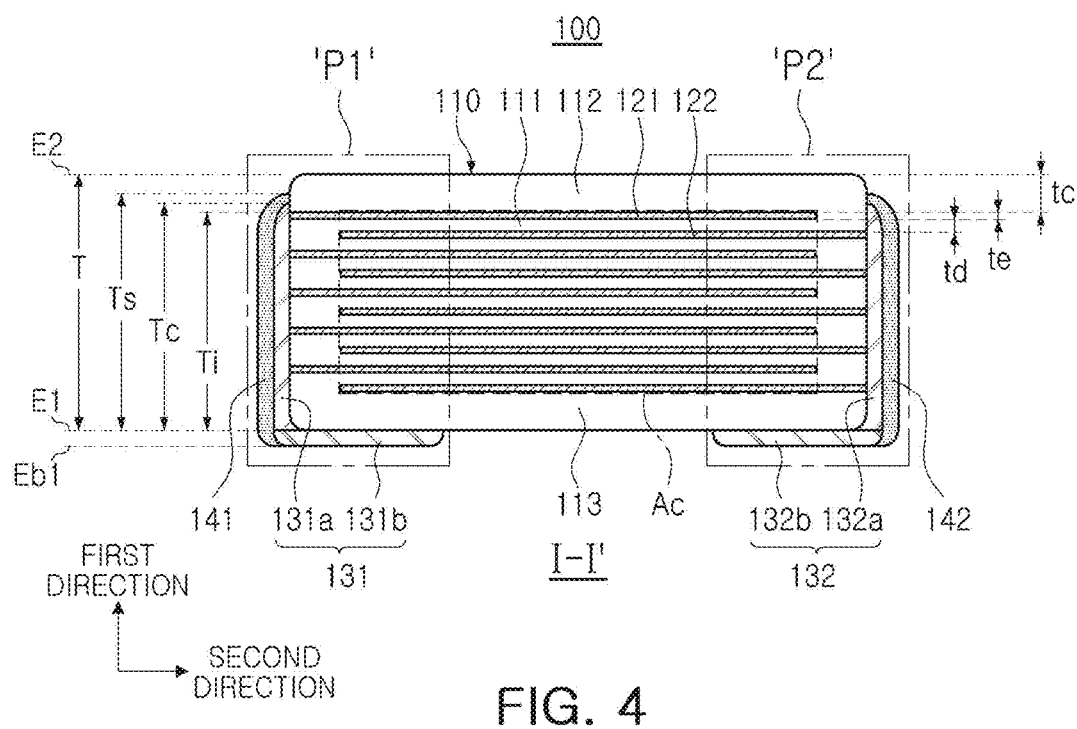
FIG. 4 is a cross-sectional view of FIG. 1, taken along line I-I'.

FIG. 4 is a cross-sectional view of FIG. 1, taken along line I-I'.

Figure 5:
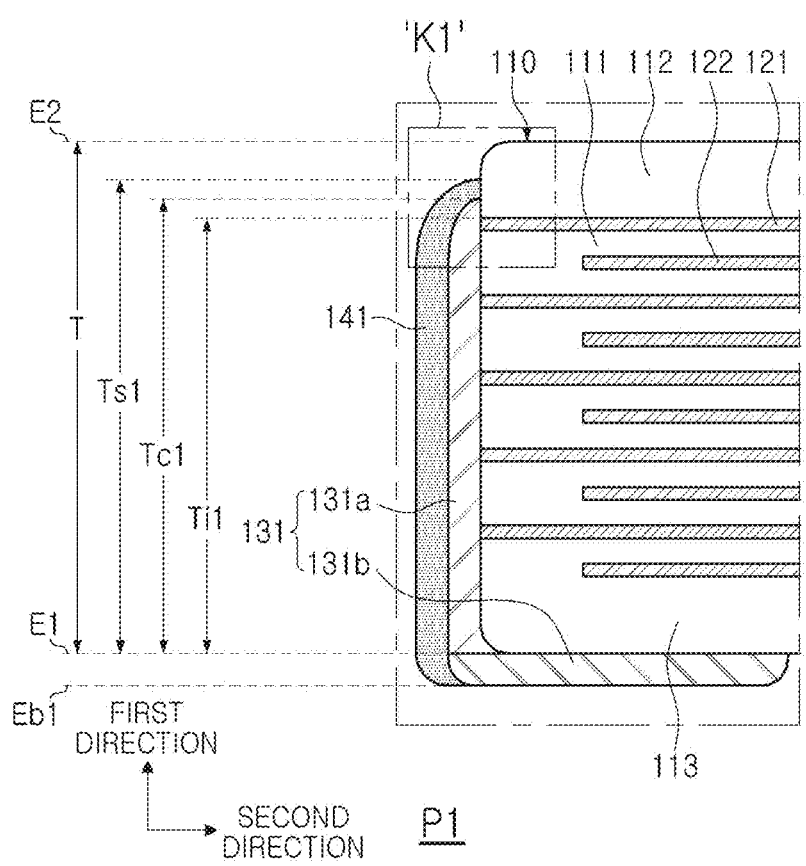
FIG. 5 is an enlarged cross-sectional view of portion P1 of FIG. 4.

FIG. 5 is an enlarged cross-sectional view of portion P1 of FIG. 4.

Figure 6:
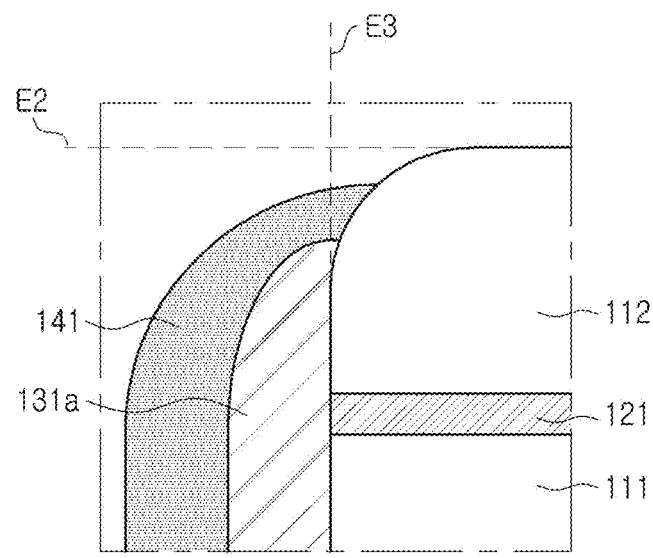
FIG. 6 is a cross-sectional view of a multilayer electronic component according to another embodiment of the present disclosure in which portion K1' corresponding to portion K1 of FIG. 5 is enlarged.

FIG. 6 is a cross-sectional view of a multilayer electronic component according to another embodiment of the present disclosure in which portion K1' corresponding to portion K1 of FIG. 5 is enlarged.

Figure 7:
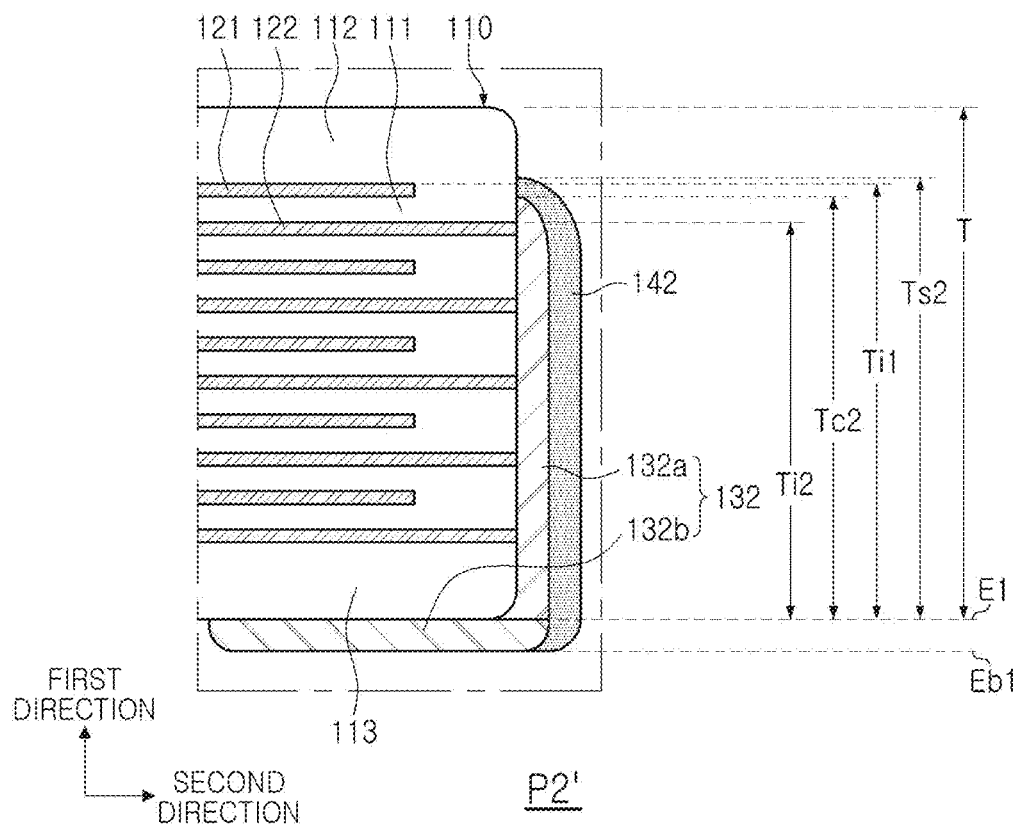
FIG. 7 is a cross-sectional view of a multilayer electronic component according to another embodiment of the present disclosure in which portion P2' corresponding to portion P2 of FIG. 4 is enlarged.

FIG. 7 is a cross-sectional view of a multilayer electronic component according to another embodiment of the present disclosure in which portion P2' corresponding to portion P2 of FIG. 4 is enlarged.

Figure 8:
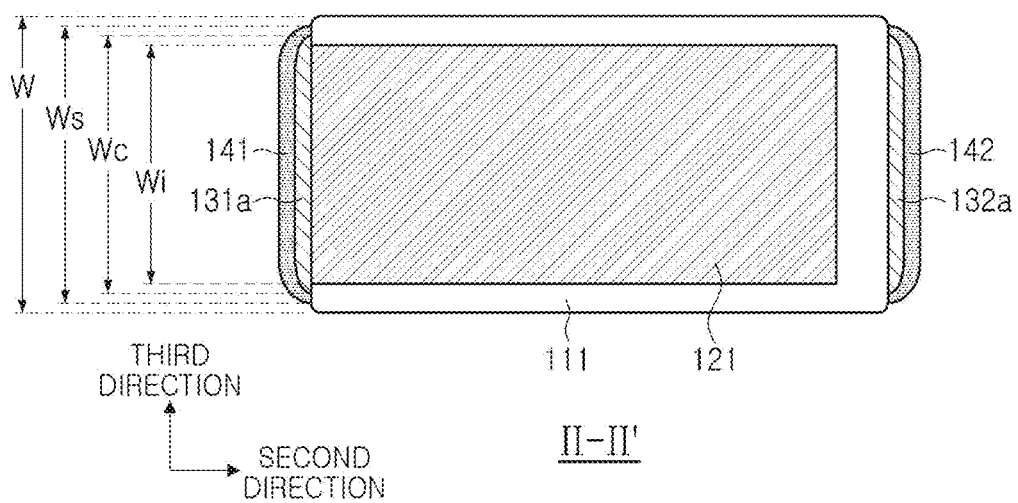
FIG. 8 is a cross-sectional view of FIG. 1, taken along line II-II'.

FIG. 8 is a cross-sectional view of FIG. 1, taken along line II-II'.

Figure 9:
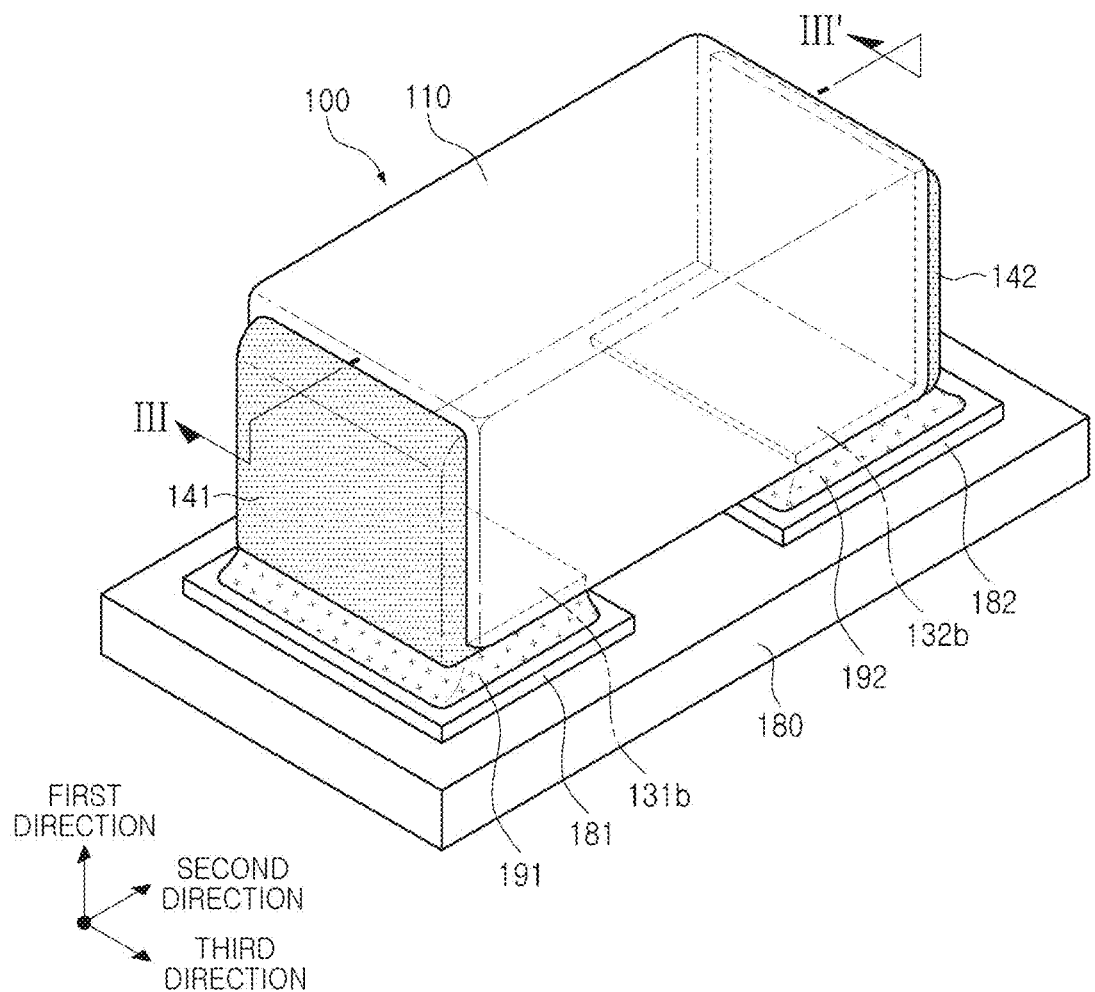
FIG. 9 is a schematic perspective view of a mounting board on which a multilayer electronic component is mounted according to an embodiment of the present disclosure.

FIG. 9 is a schematic perspective view of a mounting board on which a multilayer electronic component is mounted according to an embodiment of the present disclosure.

Figure 10:
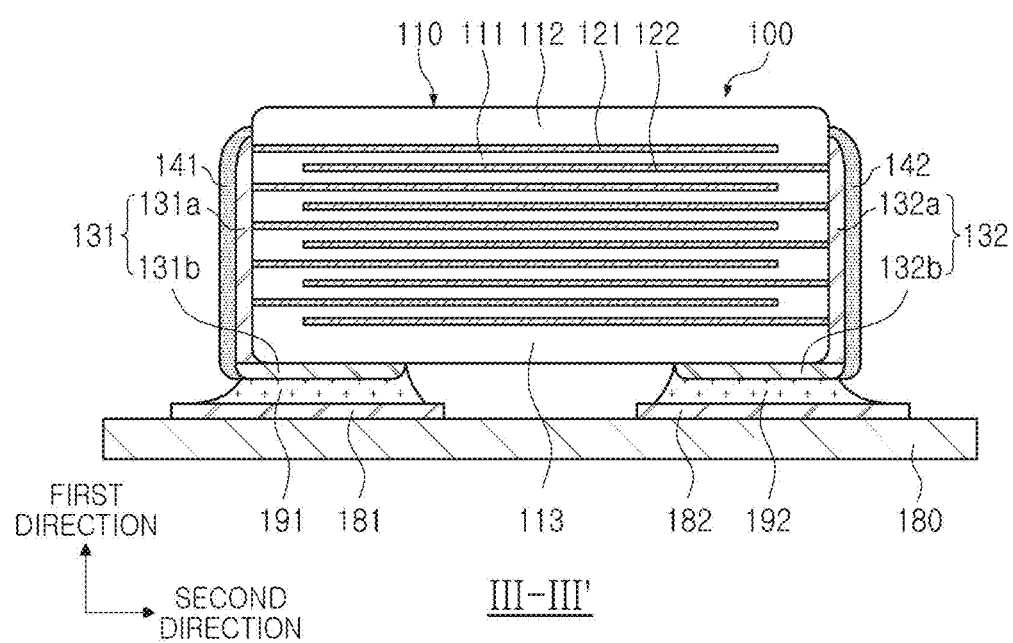
FIG. 10 is a cross-sectional view of FIG. 9, taken along line III-III'.

FIG. 10 is a cross-sectional view of FIG. 9, taken along line III-III'.

Hereinafter, a multilayer electronic component 100 according to an embodiment of the present disclosure will be described with reference to FIGS. 1 to 10.

Multilayer Electronic Component

A multilayer electronic component 100 according to an embodiment of the present disclosure may include a body 110 including a plurality of dielectric layers 111 and first and second internal electrodes 121 and 122 alternately disposed with the dielectric layers 111 in a first direction, and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction; a first external electrode 131 including a first connection portion 131a disposed on the third surface 3 and connected to the first internal electrode 121, and a first bend portion 131b extending from the first connection portion 131a to a portion of the first surface 1; a second external electrode 132 including a second connection portion 132a disposed on the fourth surface 4 and connected to the second internal electrode 122, and a second bend portion 132b extending from the second connection portion 132a to a portion of the first surface 1; a first insulating layer 141 disposed on the first connection portion 131a; and a second insulating layer 142 disposed on the second connection portion 132a. The first and second connection portions 131a and 132a may be arranged to cover exposed surfaces of the first and second internal electrodes 121 and 122, respectively, and the first and second insulating layers 141 and 142 may be arranged to cover the first and second connection portions 131a and 132a, respectively. The multilayer electronic component may satisfy the following relationship: $Ti < Tc < Ts \leq T$ where T denotes an average distance of the body 110 in the first direction, Ti denotes an average distance from the first surface 1 to an internal electrode disposed closest to the second surface 2, among the first and second internal electrodes 121 and 122, in the first direction, Tc denotes an average distance from the first surface 1 to one ends of the first and second connection portions 131a and 132a in the first direction, in the first direction, and Ts denotes an average distance from the first surface 1 to one ends of the first and second insulating layers 141 and 142 in the first direction, in the first direction.

In the body 110, the dielectric layer 111 and the internal electrodes 121 and 122 may be alternately stacked.

Although the specific shape of the body 110 is not particularly limited, the body 110 may have a hexahedral shape or the like, as illustrated. Due to shrinkage of ceramic powder particles included in the body 110 during a sintering process, the body 110 may not have a perfectly straight hexahedral shape, but may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in a second direction, and the fifth and sixth surfaces 5 and 6 connected to the first to fourth surfaces 1, 2, 3, and 4 and opposing each other in a third direction.

The body 110 may include a 1-3 edge portion connecting the first surface 1 and the third surface 3, a 1-4 edge portion connecting the first surface 1 and the fourth surface 4, a 2-3 edge portion connecting the second surface 2 and the third surface 3, and a 2-4 edge portion connecting the second surface 2 and the fourth surface 4. The 1-3 edge portion and the 2-3 edge portion may be contracted toward a center of the body in the first direction, as they approach the third surface 3, and the 1-4 edge portion and the 2-4 edge portion may be contracted toward the center of the body in the first direction, as they approach the fourth surface 4.

As a margin region in which the internal electrodes 121 and 122 are not disposed overlaps the dielectric layer 111, a step difference may occur due to a thickness of each of the internal electrodes 121 and 122. Therefore, edge portions connecting the first surface 1 and the third to fifth surfaces 3, 4, and 5 and/or edge portions connecting the second surface 2 and the third to fifth sides 3, 4, and may be contracted toward the center of the body 110 in the first direction, when viewed with reference to the first surface 1 and the second surface 2. Alternatively, due to a shrinkage behavior in a sintering process of the body 110, edge portions connecting the first surface 1 and the third to sixth surfaces 3, 4, 5, and 6 and/or edge portions connecting the second surface 2 and the third to sixth surfaces 3, 4, 5, and 6 may be contracted toward the center of the body 110 in the first direction, when viewed with respect to the first surface 1 or the second surface 2. Alternatively, to prevent chipping defects or the like, edge portions connecting the first surface 1 and the third to sixth surfaces 3, 4, 5, and 6 and/or edge portions connecting the second surface 2 and the third to sixth surfaces 3, 4, and 6 may have a round shape by performing a separate process to round corners connecting each of the surfaces of the body 110.

The edge portions may include the 1-3 edge portion connecting the first surface 1 and the third surface 3, the 1-4 edge portion connecting the first surface 1 and the fourth surface 4, the 2-3 edge portion connecting the second surface 2 and the third surface 3, and the 2-4 edge portion connecting the second surface 2 and the fourth surface 4. In addition, a 1-5 edge portion connecting the first surface 1 and the fifth surface 5, a 1-6 edge portion connecting the first surface 1 and the sixth surface 6, a 2-5 edge portion connecting the second surface 2 and the fifth surface 5 and a 2-6 edge portion connecting the second surface 2 and the sixth surface 6 may be included. The first to sixth surfaces 1, 2, 3, 4, 5, and 6 of the body 110 may be generally flat surfaces, and non-flat regions may be considered as edge portions. Hereinafter, an extension line of each of the surfaces may mean a line extended based on a flat portion of each of the surfaces.

To suppress a step difference due to the internal electrodes 121 and 122, after a stacking operation is performed, and the internal electrodes 121 and 122 are cut to be exposed to the fifth and sixth surfaces 5 and 6 of the body 110, in forming margin portions 114 and 115 by stacking a single dielectric layer or two or more dielectric layers in the third direction (the width direction), both lateral directions of an active portion Ac, a portion connecting the first surface 1 and the fifth and sixth surfaces 5 and 6 and a portion connecting the second surface 2 and the fifth and sixth surfaces 5 and 6 may not be contracted.

The plurality of dielectric layers 111 forming the body 110 may be in a sintered state, and a boundary between adjacent dielectric layers 111 may be integrated to such an extent that it may be difficult to identify the device without using a scanning electron microscope (SEM).

A raw material for forming the dielectric layer 111 is not particularly limited, as long as sufficient capacitance may be obtained therewith. For example, a barium titanate-based material, a lead composite perovskite-based material, a strontium titanate-based material, or the like may be used.

The barium titanate-based material may include a $BaTiO_3$-based ceramic powder, and examples of the ceramic powder may include $BaTiO_3$, or $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), $Ba(Ti_{1-y}Zr_y)O_3$ (0<y<1), or the like, in which calcium (Ca), zirconium (Zr), or the like is partially dissolved in $BaTiO_3$, or the like.

In addition, various ceramic additives, organic solvents, binders, dispersants, or the like may be added to the powder of barium titanate ($BaTiO_3$), and the like, as the material for forming the dielectric layer 111.

An average thicknesses td of the dielectric layer 111 does not need to be particularly limited. In general, when the dielectric layer is thinly formed to have an average thickness of 0.6 μm or less, in particular, when the average thickness of the dielectric layer 111 is 0.4 μm or less, reliability may be deteriorated. According to an embodiment of the present disclosure, by arranging the insulating layers 141 and 142 containing a resin on the connection portions 131a and 132a of the external electrodes, penetration of external moisture, penetration of a plating solution, or the like may be prevented, and reliability may be improved. Therefore, excellent reliability may be secured even when the average thickness td of the dielectric layer 111 is 0.4 μm or less.

The average thickness td of the dielectric layer 111 may be an average thickness of the dielectric layer 111 disposed between the first and second internal electrodes 121 and 122.

The average thickness td of the dielectric layer 111 may be measured by scanning the cross-sections in the first and second directions (length and thickness directions, an L-T plane) of the body 110 with a scanning electron microscope (SEM) with a magnification of 10,000. More specifically, an average value thereof may be determined by measuring a thickness of one (1) dielectric layer at thirty (30) equally spaced points in the second direction (the length direction) in the scanned image. The thirty (30) equally spaced points may be designated in the active portion Ac. In addition, when such an average value is determined by using measurements of average values to ten (10) dielectric layers, the average thickness td of the dielectric layer 111 may be more generalized. In this case, the average thickness td of the dielectric layer 111 may mean an average distance in the first direction.

The body 110 may include an active portion Ac disposed in the body 110 and including the first internal electrode 121 and the second internal electrode 122, disposed to oppose each other, with the dielectric layer 111 interposed therebetween to form capacitance, and upper and lower cover portions 112 and 113 formed on both end surfaces of the active portion Ac in the first direction, and margin portions 114 and 115 may be disposed on both side surfaces of the active portion Ac in the third direction.

The active portion Ac may be a portion contributing to capacitance formation of the multilayer electronic component, and may be formed by repeatedly stacking the plurality of first and second internal electrodes 121 and 122 with the dielectric layer 111 interposed therebetween.

The cover portions 112 and 113 may include an upper cover portion 112 disposed above the active portion Ac in the first direction, and a lower cover portion 113 disposed below the active portion Ac in the first direction.

The upper cover portion 112 and the lower cover portion 113 may be formed by stacking a single dielectric layer or two or more dielectric layers on upper and lower surfaces of the active portion Ac, respectively, in the first direction (the thickness direction), and may basically play a role in preventing damage to the internal electrodes due to physical or chemical stress.

The upper cover portion 112 and the lower cover portion 113 may not include internal electrodes, and may include the same material as the dielectric layer 111. For example, the upper cover portion 112 and the lower cover portion 113 may include a ceramic material, and may include, for example, a barium titanate ($BaTiO_3$)-based ceramic material.

Average thicknesses tc of the cover portions 112 and 113 are not particularly limited. To more easily achieve miniaturization and high capacitance of the multilayer electronic component, an average thickness tc of each of the cover portions 112 and 113 may be 100 μm or less, and preferably 30 μm or less, and, in case of ultra-small products, more preferably 20 μm or less. An effect of improving reliability by disposing the insulating layers 141 and 142 on the connection portions 131a and 132a of the external electrodes may be the same as described above. Even when the average thickness tc of each of the cover portions 112 and 113 is 30 μm or less, excellent reliability may be secured, and even when the average thickness tc of each of the cover portions 112 and 113 is 20 μm or less, excellent reliability may be obtained.

The average thickness tc of each of the cover portions 112 and 113 may be an average value of distances (thicknesses) in the first direction measured at five (5) equally spaced points of the upper or lower cover portions 112 or 113 of the active portion Ac. In this case, the average thickness tc of each of the cover portions 112 and 113 may mean an average distance in the first direction.

The margin portions 114 and 115 may include a first margin portion 114 disposed on the fifth surface 5 of the body 110, and a second margin portion 115 disposed on the sixth surface 6 of the body 110. For example, the margin portions 114 and 115 may be disposed on both side surfaces of the body 110 in the third direction (the width direction).

As illustrated in FIG. 2, the margin portions 114 and 115 may refer to regions between both side surfaces of the first and second internal electrodes 121 and 122, and an external surface of the body 110, in a cross-section of the body 110 cut in the first and third directions (the thickness and width directions, WT direction) and a boundary surface of the body 110.

The margin portions 114 and 115 may basically play a role in preventing damage to the internal electrodes due to physical or chemical stress.

The margin portions 114 and 115 may be prepared by forming the internal electrodes on a ceramic green sheet by a vacuum deposition process, which will be described later, except for a portion in which the margin portions 114 and 115 are formed. As described above, to suppress a step difference due to the internal electrodes 121 and 122, after a stacking operation is performed, and the internal electrodes 121 and 122 are cut to be exposed to the fifth and sixth surfaces 5 and 6 of the body 110, the margin portions 114 and 115 may be formed by stacking a single dielectric layer or two or more dielectric layers on both side surfaces of the active portion Ac in the third direction (the width direction).

Average widths of the first and second margin portions 114 and 115 does not need to be particularly limited. To more easily achieve miniaturization and high capacitance of the multilayer electronic component 100, an average width of each of the first and second margin portions 114 and 115 may be 80 μm or less, and preferably 30 μm or less, and, in case of ultra-small products, more preferably 20 μm or less.

An effect of improving reliability by disposing the insulating layers 141 and 142 on the connection portions 131a and 132a of the external electrodes may be the same as described above. Even when the average width of each of the margin portions 114 and 115 is 30 μm or less, excellent reliability may be secured, and even when the average width of each of the margin portions 114 and 115 is 20 μm or less, excellent reliability may be obtained.

The average width of each of the margin portions 114 and 115 may be an average value of widths of each of the margin portions 114 and 115 measured at five (5) equally spaced points in the first direction from the side surface of the active portion Ac. In this case, the average width of each of the margin portions 114 and 115 may mean an average distance of the margin portions 114 and 115 in the third direction.

The internal electrodes 121 and 122 may be alternately stacked with the dielectric layer 111. The internal electrodes 121 and 122 may include the first internal electrode 121 and the second internal electrode 122, and the first and second internal electrodes 121 and 122 may be alternately disposed to oppose each other with the dielectric layers 111, constituting the body 110, interposed therebetween, and may be exposed from the third and fourth surfaces 3 and 4 of the body 110, respectively.

Referring to FIG. 4, the first internal electrode 121 may be spaced apart from the fourth surface 4, and may be exposed from the third surface 3, and the second internal electrode 122 may be spaced apart from the third surface 3, and may be exposed from the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

For example, the first internal electrode 121 may not be connected to the second external electrode 132, but may be connected to the first external electrode 131, and the second internal electrode 122 may not be connected to the first external electrode 131, but may be connected to the second external electrode 132. In this case, the first and second internal electrodes 121 and 122 may be electrically separated from each other by the dielectric layer 111 interposed therebetween.

The body 110 may be formed by alternately stacking a ceramic green sheet on which the first internal electrode 121 is printed and a ceramic green sheet on which the second internal electrode 122 is printed, and then sintering the stacked ceramic green sheets.

A material for forming the internal electrodes 121 and 122 not particularly limited, and a material having excellent electrical conductivity may be used. For example, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheets. As a printing method of the conductive paste for the internal electrodes, a screen-printing method, a gravure printing method, or the like may be used, but the present disclosure is not limited thereto.

Average thickness te of the internal electrodes 121 and 122 do not need to be particularly limited. In general, when the internal electrodes 121 and 122 are thinly formed to have an average thickness of 0.6 μm or less, in particular, when the average thickness of each of the internal electrodes 121 and 122 is 0.4 μm or less, reliability may be deteriorated. According to an embodiment of the present disclosure, by arranging the insulating layers 141 and 142 containing a resin on the connection portions 131a and 132a of the external electrodes, penetration of external moisture, penetration of a plating solution, or the like may be prevented, and reliability may be improved. Therefore, excellent reliability may be secured even when the average thickness te of each of the internal electrodes 121 and 122 is 0.4 μm or less.

The average thickness te of each of the internal electrodes 121 and 122 may be measured by scanning the cross-sections in the first and second directions (length and thickness directions, an L-T plane) of the body 110 with a scanning electron microscope (SEM) with a magnification of 10,000. More specifically, an average value thereof may be determined by measuring a thickness of one (1) internal electrode at thirty (30) equally spaced points in the second direction (the length direction) in the scanned image. The thirty (30) equally spaced points may be designated in the active portion Ac. In addition, when such an average value is determined by using measurements of average values to ten (10) internal electrodes, the average thickness te of the internal electrode may be more generalized. In this case, the average thickness te of the internal electrode may mean an average distance in the first direction.

In an embodiment of the present disclosure, a structure in which the multilayer electronic component 100 has two external electrodes 131 and 132 is illustrated, but the number, shapes, or the like of the external electrodes 131 and 132 may be changed, depending on shapes of the internal electrodes 121 and 122, or other purposes.

The external electrodes 131 and 132 may be disposed on the third and fourth surfaces 3 and 4 of the body 110, respectively. More specifically, the external electrodes 131 and 132 may be disposed on the third and fourth surfaces 3 and 4 of the body 110, respectively, and may include first and second connection portions 131a and 132a connected to the first and second internal electrodes 121 and 122, respectively.

In the external electrodes 131 and 132, regions disposed on the 1-3 edge portion and the 1-4 edge portion of the body 110 may be referred to as edge regions (not labeled), regions disposed on the third and fourth surfaces 3 and 4 of the body 110 may be referred to as connection portions 131a and 132a, and regions disposed on the first surface 1 of the body 110 may be referred to as bend portions 131b and 132b.

In the present specification, since the bend portions 131b and 132b extend from the connection portions 131a and 132a to a portion of the first surface 1, the bend portions 131b and 132b may be described as including an edge portion (not labeled). As necessary, the bend portions 131b and 132b and the edge portion (not labeled) may be separately described.

The external electrodes 131 and 132 may include a first external electrode 131 disposed on the third surface 3 and including a first connection portion 131a connected to the first internal electrode 121 and a first bend portion 131b extending from the first connection portion 131a to a portion of the first surface 1, and a second external electrode 132 disposed on the fourth surface 4 and including a second connection portion 132a connected to the second internal electrode 122 and a second bend portion 132b extending from the second connection portion 132a to a portion of the first surface 1. For example, the first connection portion 131a may be connected to the first internal electrode 121 on the third surface 3, and the second connection portion 132a may be connected to the second internal electrode 122 on the fourth surface 4.

The external electrodes 131 and 132 may be formed of any material as long as they have electrical conductivity, such as a metal, and specific materials may be determined in consideration of electrical characteristics, structural stability, or the like, and further may have a multilayer structure.

The external electrodes 131 and 132 may be sintered electrodes including a conductive metal and a glass, or resin-based electrodes including a conductive metal and a resin.

In addition, the external electrodes 131 and 132 may have a form in which the sintered electrode and the resin-based electrode are sequentially formed on the body 110. In addition, the external electrodes 131 and 132 may be formed by transferring a sheet including the conductive metal on the body 110, or may be formed by transferring the sheet including the conductive metal to the sintered electrode.

As the conductive metal included in the external electrodes 131 and 132, a material having excellent electrical conductivity may be used, but is not particularly limited thereto. For example, the conductive metal may be one or more of copper (Cu), nickel (Ni), palladium (Pd), silver (Ag), tin (Sn), chromium (Cr), and alloys thereof. When the external electrodes 131 and 132 include at least one of Ni or a Ni alloy, connectivity with the internal electrodes 121 and 122 including Ni may be further improved.

In the present specification, the connection portions 131a and 132a and the bend portions 131b and 132b of the external electrode have been separately described, but this may be separated for convenience of structural description. Main component conductive metals of the connection portions 131a and 132a may be equal to main component conductive metals of the bend portions 131b and 132b. However, the present disclosure is not particularly limited thereto. When it is necessary to change the components of the bend portions 131b and 132b, main components of the connection portions 131a and 132a may be different from main components of the bend portions 131b and 132b. For example, a main component of the first connection portion 131a may be different from a main component of the first bend portion 131b, and a main component of the second connection portion 132a may be different from a main component of the second bend portion 132b.

The insulating layers 141 and 142 may be disposed on the connection portions 131a and 132a. More specifically, the first insulating layer 141 may be disposed on the first connection portion 131a, and the second insulating layer 142 may be disposed on the second connection portion 132a.

The first and second connection portions 131a and 132a may be connected to the first and second internal electrodes 121 and 122, and may thus be paths for penetration of a plating solution during a plating process or penetration of external moisture during actual use. In an embodiment of the present disclosure, since the insulating layers 141 and 142 may be further disposed on the connection portions 131a and 132a, the penetration of the plating solution or the penetration of external moisture may be more effectively prevented.

The insulating layers 141 and 142 may include a resin. Conventionally, a glass-based material is generally used for an insulating layer. Due to nature of the glass-based material, aggregation has occurred excessively during a sintering process, making it difficult to form uniformly. Since heat is required during the sintering process, stress may be generated in a body, which may cause cracks or delamination. In addition, when an insulating layer including the glass-based material is used, a method of sintering the insulating layer including the glass-based material after sintering an external electrode has used. In this case, in the process of sintering the insulating layer, there is a fear that a metal material of the external electrode may be diffused into an internal electrode, resulting in radial cracks. Furthermore, since the glass-based material generally has strong hardness properties, there may be a concern that it may be broken even by a small impact.

Therefore, by including a resin, instead of the glass-based material, may be included in the insulating layer to solve problems of a glass-based insulating layer. The resin may have superior impact resistance and may be cured at low temperatures, compared to the glass-based material. Therefore, cracks caused by heat shrinkage, radial cracks caused by metal diffusion, or the like may be suppressed. Furthermore, the resin may have advantages in terms of cost, supply, or the like, compared to the glass-based material.

A type of the resin is not particularly limited, and for example, may include one or more selected from an epoxy resin, an acrylic resin, ethyl cellulose, and a polymer resin.

In an embodiment of the present disclosure, the insulating layers 141 and 142 may include at least one additive selected from $SiO_2$, $TiO_2$, $BaTiO_3$, $BaO$, $Al_2O_3$, $ZnO$, and the like, in addition to the resin. However, the present disclosure is not particularly limited thereto, and the insulating layers 141 and 142 may include an oxide or inorganic powder having high insulating properties.

The additive included in the insulating layers 141 and 142 may have excellent bonding strength with a dielectric material included in the body 110 and glass included in the external electrodes 131 and 132, and may thus improve their binding forces with the body 110 and the external electrodes 131 and 132.

A method of forming the insulating layers 141 and 142 does not need to be particularly limited. For example, after the external electrodes 131 and 132 are formed on the body 110, a resin may be printed thereon, a resin may be manufactured into a sheet and then transferred, or the body 110 or the like containing a resin may be dipped, to form the insulating layers 141 and 142. In addition, the insulating layers 141 and 142 may be formed by applying one or more of the above methods.

In an embodiment of the present disclosure, the insulating layers 141 and 142 may be disposed to directly contact the first and second external electrodes 131 and 132, and a region in which the insulating layers 141 and 142 may be disposed on outer surfaces of the first and second external electrodes 131 and 132 may suppress erosion of the external electrode by the plating solution.

As various electronic devices are miniaturized and have high output, demand for decreasing the size and increasing the capacitance of multilayer ceramic capacitors is increasing. For this, it is necessary to mount as many components as possible within a limited area of the substrate. For this purpose, it is necessary to minimize the mounting space. Therefore, an attempt was made to increase the effective volume by modifying the structure of the external electrode and reducing the specific gravity of the portion that does not contribute to capacitance formation is in progress. However, in the case of an L-shaped electrode or the like, the junction between the external electrode and the ceramic body may be separated due to external impacts, and external moisture or the like may pass through the separated gap, to weaken reliability of the multilayer electronic components.

According to an embodiment of the present disclosure, it is possible to improve reliability by controlling a shape of an external electrode or an insulating layer, to prevent penetration of external moisture or the like, or to prevent the external electrode from being separated from a ceramic body in preparation for an impact.

Referring to FIG. 4, in a multilayer electronic component 100 according to an embodiment of the present disclosure, the first connection portion 131a may be disposed not to expose an exposed surface of the first internal electrode 121 externally, and the second connection portion 132a may be disposed not to expose an exposed surface of the second internal electrode 122 externally. For example, the first and second connection portions 131a and 132a may be arranged to be connected, including exposed surfaces of an internal electrode disposed closest to the second surface 2, among the first and second internal electrodes 121 and 122, from the first surface 1.

More specifically, the multilayer electronic component 100 may satisfy relationship $Ti < Tc < Ts \leq T$, where T denotes an average distance (thickness) of the body 110 in the first direction, Ti denotes an average distance from the first surface 1 to an internal electrode disposed closest to the second surface 2, among the first and second internal electrodes, in the first direction, Tc denotes an average distance from the first surface 1 to one ends of the first and second connection portions 131a and 132a in the first direction, in the first direction, and Ts denotes an average distance from the first surface 1 to one ends of the first and second insulating layers 141 and 142 in the first direction, in the first direction.

More specifically, the first insulating layer 141 may be disposed to cover an end of the first connection portion 131a in the first direction, and the second insulating layer 142 may be disposed to cover an end of the second connection portion 132a in the first direction. The multilayer electronic component 100 may satisfy relationships $Ti1 < Tc1 < Ts1 \leq T$ and $Ti2 < Tc2 < Ts2 \leq T$, where T denotes an average distance (thickness) of the body 110 in the first direction, Ti1 denotes an average distance from the first surface 1 to a first internal electrode 121 disposed closest to the second surface 2, in the first direction, Ti2 denotes an average distance from the first surface 1 to a second internal electrode 122 disposed closest to the second surface 2, in the first direction, Tc1 denotes an average distance from the first surface 1 to one end of the first connection portion 131a in the first direction, Tc2 denotes an average distance from the first surface 1 to one end of the second connection portion 132a in the first direction, Ts1 denotes an average distance from the first surface to one end of the first insulating layer 141 in the first direction, and Ts2 denotes an average distance from the first surface to one end of the second insulating layer 142 in the first direction.

Average distances of the first and second connection portions 131a and 132a in the first direction may be different. Referring to FIGS. 5 and 7, the average distance Tc2 of the second connection portion 132a in the first direction may be sufficient to exceed the average distance Ti2 of the second internal electrode 122 in the first direction. Although the average distance Tc2 of the second connection portion 132a in the first direction does not exceed the average distance Ti1 of the first internal electrode 121 in the first direction, penetration of moisture or the like into an interface between the second connection portion 132a and the fourth surface 4 of the body may be prevented to improve reliability of the multilayer electronic component 100.

In this case, thicknesses of the body 110, the connection portions 131a and 132a, and the insulating layers 141 and 142 in the first direction may be measured through distances of cross-sections in the first and second directions (the length and thickness directions, the L-T plane) by SEM. The average distances in the first direction may be obtained by measuring distances in the first direction at 30 equally spaced points in the third direction (the width direction) and calculating an average value therefrom. In this case, the distance in the first direction may mean a height or a thickness.

For example, the connection portions 131a and 132a may be disposed from the first surface 1 to exceed a height of an outermost layer of the internal electrodes 121 and 122 disposed closest to the second surface 2, and may be disposed on or below an extension line E2 of the second surface of the body 110. In this case, the outermost layer of the internal electrodes 121 and 122 may be one of the first and second internal electrodes 121 and 122 disposed closest to the second surface 2, and the 'height or thickness' may mean a distance from a reference point, and more specifically a distance in the first direction from the first surface 1 of the body 110. The connection portions 131a and 132a may be formed to reach a position higher than the height or thickness of the outermost layers of the internal electrodes 121 and 122 in the first direction. Therefore, connectivity between the connection portions 131a and 132a and the internal electrodes 121 and 122 may not be deteriorated, and may prevent penetration of external moisture or the like into an interface between the connection portions 131a and 132a and the body 110.

In addition, since ends of the connection portions 131a and 132a in the first direction may be disposed on or below the extension line E2 of the second surface of the body 110, a thickness of the multilayer electronic component 100 may not increase. Therefore, a volume of the multilayer electronic component 100 may be reduced to minimize a mounting space.

For example, the first external electrode 131 and the second external electrode 132 may not be disposed on the second surface 2. As the first connection portion 131a of the first external electrode and the second connection portion 132a of the second external electrode are not disposed on the second surface 2, the first connection portion 131a and the second connection portion 132a may be disposed on or below the extension line E2 of the second surface of the body 110.

Referring to FIG. 6, an end of a first connection portion 131a in the first direction may be located in a 2-3 edge portion of a body 110, and may be disposed on or below an extension line E2 of a second surface, and, in the second direction, the end of the first connection portion 131a may be disposed on a right side of an extension line E3 of a third surface 3, to contact the body 110. In addition, one end of a first insulating layer 141 covering the first connection portion 131a in the first direction may be located to contact the 2-3 edge portion of the body 110, and, in the first direction, may be disposed on or below the extension line E2 of the second surface 2, and, in the second direction, may be disposed on the right side of the extension line E3 of the third surface 3 in the second direction, to contact the body 110. As the first connection portion 131a and the first insulating layer 141 come into contact with the 2-3 edge portion of the body 110, penetration of external moisture may be effectively prevented. Therefore, even in a structure in which a second connection portion 132a and a second insulating layer 142 are in contact with a 2-4 edge portion of the body 110, as described above, the penetration of external moisture may be effectively prevented.

Referring to a multilayer electronic component 100 according to an embodiment of the present disclosure with reference to FIGS. 4 and 5, insulating layers 141 and 142 may be disposed between an extension line Eb1 of an outer side surface of bend portions 131b and 132b and an extension line E2 of a second surface 2. In this case, the outer side surface of the bend portions 131b and 132b may refer to a surface exposed externally, not an interface contacting a body 110, among surfaces parallel to a first surface 1 of the body 110.

More specifically, a first insulating layer 141 may be disposed between an extension line Eb1 of an outer side surface of a first bend portion 131b and the extension line E2 of the second surface 2, and a second insulation layer 142 may be disposed between an extension line Eb1 of an outer side surface of a second bend portion 132b and the extension line E2 of the second surface 2. In this case, the extension line Eb1 of the outer side surface of the first bend portion may be identical to the extension line Eb1 of the outer surface of the second bend portion, but the present disclosure is not particularly limited thereto, and the extension lines of the outer side surfaces of the first and second bend portions may not match.

For example, when viewed in the first direction, one end of each of the first and second insulating layers 141 and 142 may be located between an outermost layer of each of the internal electrodes 121 and 122 and the extension line E2 of the second surface of the body, and the other end of each of the first and second insulating layers 141 and 142 may be located between the extension line E1 of the first surface of the body and the extension line Eb1 of the outer side surface of the bend portion. However, referring to FIGS. 9 and 10, the present disclosure is not particularly limited thereto, and shapes of solders 191 and 192 may be changed, as needed, in mounting thereof on a substrate 180, and the solders 191 and 192 may cover a portion or all of the outer side surfaces of the bend portions 131b and 132b. For example, the insulating layers 141 and 142 may be disposed to cover the connection portions 131a and 132a and a portion of a bend portion on an edge portion (a 1-3 edge portion or a 1-4 edge portion). Therefore, excessive formation of the solders 191 and 192 may be prevented to minimize a mounting space.

In a multilayer electronic component 100 according to an embodiment of the present disclosure, an average distance (or an average thickness) of each of the insulating layers 141 and 142 in the second direction may be 500 nm or more and 50 μm or less.

When the average distance of each of the insulating layers 141 and 142 in the second direction is less than 500 nm, the body 110 or the internal electrodes 121 and 122 may be damaged, due to failure to effectively block penetration of moisture or insufficient protection of the body 110. When the average distance of each of the insulating layers 141 and 142 in the second direction is greater than 50 μm, specific gravity of the insulating layers 141 and 142 may be excessive. Therefore, it may be difficult to minimize the capacitance per unit volume of the multilayer electronic component 100.

The average distance of each of the insulating layers 141 and 142 in the second direction may be an average value measured in the second direction at thirty (30) equally spaced points in the first direction in cross-sections in the first and second directions (the length and thickness directions, the L-T plane).

A multilayer electronic component 100 according to an embodiment of the present disclosure, in which the first and second connection portions 131a and 132a may be disposed to cover exposed surfaces of the first and second internal electrodes 121 and 122, respectively, and, the first and second insulating layers 141 and 142 may be disposed to cover the first and second connection portions 131a and 132a, respectively, may satisfy relationship Wi<Wc<Ws≤W, where W denotes an average distance of the body 110 in the third direction, Wi denotes an average distance of each of the first and second internal electrodes 121 and 122 in the third direction, Wc denotes an average distance of each of the first and second connection portions 131a and 132a in the third direction, and Ws denotes an average distance of each of the first and second insulating layers 141 and 142 in the third direction.

Referring to a multilayer electronic component 100 with reference to FIG. 8, the first and second connection portions 131a and 132a may be disposed to cover the first and second internal electrodes 121 and 122, respectively, and the multilayer electronic component 100 may satisfy relationship Wi<Wc≤W, where Wi denotes an average distance of each of the first and second internal electrodes 121 and 122 in the third direction, Wc denotes an average third of each of the first and second connection portions 131a and 132a in the third direction, and W denotes an average third of the body 110 in the third direction.

In addition, the first and second insulating layers 141 and 142 may be disposed to cover the first and second connection portions 131a and 132a, respectively. In this case, the multilayer electronic component 100 may satisfy relationship Wi<Wc<Ws≤W, where Wi denotes an average distance of each of the first and second internal electrodes 121 and 122 in the third direction, Wc denotes an average distance of each of the first and second connection portions 131a and 132a in the third direction, W denotes an average distance of the body 110 in the third direction, and Ws denotes an average distance of each of the first and second insulating layers 141 and 142 in the third direction.

More specifically, when the average distance Wc of each of the connection portions 131a and 132a in the third direction exceeds the average distance Wi of each of the internal electrodes 121 and 122 in the third direction and is equal to or shorter than the average distance W of the body 110 in the third direction, penetration of external moisture or the like may be effectively prevented. In addition, when the average distance Ws of each of the insulating layers 141 and 142 in the third direction exceeds the average distance Wc of each of the connection portions 131a and 132a in the third direction and is equal to or smaller than the average distance W of the body 110 in the third direction, it is possible to protect the body 110 or the like from external impacts, and penetration of external moisture or the like may be more effectively prevented, to improve reliability of the multilayer electronic component 100.

In this case, the first connection portion 131a may be disposed to cover a portion of the first internal electrode 121 in the third direction such that the first internal electrode 121 is not exposed externally, and the second connection portion 132a may be disposed to cover a portion of the second internal electrode 122 in the third direction such that the second internal electrode 122 is not exposed externally.

In this case, the average distances of the body 110, the internal electrodes 121 and 122, the connection portions 131a and 132a, and the insulating layers 141 and 142 in the third direction may be measured through distances of cross-sections of the body 110 including the internal electrodes in the second and third directions (length and width directions, an L-W plane) by SEM. More specifically, the average distances in the third direction may be further generalized by measuring distances of the cross-sections in the second and third directions, in the third direction, extending these measurements to ten (10) layers including the internal electrodes, and calculating average distances therefrom.

A plated layer (not illustrated) may be disposed on the insulating layers 141 and 142.

The plated layer may serve to improve mounting characteristics. A type of the plated layer is not particularly limited, may be a plated layer including at least one of nickel (Ni), tin (Sn), palladium (Pd), or alloys thereof, and may be formed as a plurality of layers.

For a more specific example of the plated layer, the plated layer may be a Ni plated layer or a Sn plated layer, and may be a form in which the Ni plated layer and the Sn plated layer are sequentially formed on each of the insulating layers 141 and 142, and may have a form in which the Sn plated layer, the Ni plated layer, and the Sn plated layer are sequentially formed. Further, the plated layer may include a plurality of Ni plated layers and/or a plurality of Sn plated layers.

Referring to FIGS. 9 and 10 illustrating a mounting board on which a multilayer electronic component 100 is mounted, bend portions 131b and 132b may be bonded to electrode pads 181 and 182 by solders 191 and 192 disposed on a substrate 180.

When internal electrodes 121 and 122 are stacked in the first direction, the multilayer electronic component 100 may be horizontally mounted on the substrate 180 such that the internal electrodes 121 and 122 are arranged to be parallel to a mounting surface. However, the present disclosure is not limited to the horizontal mounting, and when the internal electrodes 121 and 122 are stacked in the third direction, the multilayer electronic component 100 may be perpendicularly mounted on the substrate 180 such that the internal electrodes 121 and 122 are arranged to be perpendicular to the mounting surface.

A size of the multilayer electronic component 100 does not need to be particularly limited.

In order to achieve miniaturization and high capacitance at the same time, a thickness of a dielectric layer and a thickness of an internal electrode should increase to increase the number of layers. Therefore, in a multilayer electronic component 100 having a size of 0402 (length×width, 0.4 mm×0.2 mm) or less, effects of improving reliability and capacitance per unit volume may be more significant.

Hereinafter, the present disclosure will be described in more detail through examples, but these may be provided to help a specific understanding of the present disclosure, and the scope of the present disclosure is not limited to the following Example.

Example

Capacitance and moisture-resistance reliability according to a height of an outermost layer of an internal electrode, a height of a connection portion of an external electrode, and a thickness of a body were evaluated, and were illustrated in Table 1 below. Capacitance and moisture-resistance reliability according to a width of the internal electrode, a width of the external electrode, and a width of the body were evaluated, and were illustrated in Table 2 below.

The height of the outermost layer of the internal electrode means a height from a first surface of the body to an internal electrode disposed closest to a second surface, the height of the connection portion of the external electrode means a height from an extension line of the first surface of the body to one end of the connection portion in the first direction, and the thickness of the body means a height from the first surface to the second surface of the body. An insulating layer was formed from an edge portion to cover the one end of the connection portion, not to exceed the thickness of the body.

In this case, the height or thickness was measured by grinding a multilayer electronic component to a depth of ½ in the third direction (the width direction), and exposing cross-sections thereof in the first and second directions (the length and thickness directions, the L-T plane), and the width was measured by polishing the multilayer electronic component to a depth of ½ in the first direction (the thickness direction), and exposing cross-sections thereof in the second and third directions (the length and width directions, the L-W plane).

The dielectric layer included titanium barium ($BaTiO_3$), the internal electrode included nickel (Ni), the connection portion of the external electrode included copper (Cu), and the insulating layer included an epoxy resin, to prepare the multilayer electronic component.

Tables 1 and 2 below illustrated data evaluating capacitance and moisture resistance reliability by mounting four hundreds (400) multilayer electronic components on the substrate.

In the capacitance evaluation, when measured dose value (μF) decreased to less than 10%, compared to a reference dose (μF), it was evaluated as "poor" and marked as "X" in the tables below, and when measured dose value (μF) did not decrease to less than 10%, compared to the reference dose (μF), it was evaluated as "not poor" and marked as "0" in the tables below.

Moisture resistance reliability evaluation was conducted with the 8585 test, and was evaluated by applying a rated voltage of 1 Vr for 24 hours under a temperature condition of 85° C. and a relative humidity condition of 85%. In this case, even when one of insulation resistance (IR) values of the multilayer electronic component falls to $10^6$ or less, compared to an initial insulation resistance (IR), it was evaluated as "poor" and marked as "X" in the tables below, and when no insulation resistance (IR) value of the multilayer electronic component falls to $10^6$ or less, compared to the initial insulation resistance (IR), it was evaluated as "not poor" and marked as "0" in the tables below.

TABLE 1

| Test No. | Height of Connection Portion Tc (μm) | Height of Internal Electrode Ti (μm) | Thickness of Body T (μm) | Capacitance (μF) | Moisture Reliability |
|---|---|---|---|---|---|
| 1* | 338 | 312 | 332 | ○ | X |
| 2* | 334 | 311 | 332 | ○ | X |
| 3 | 331 | 311 | 331 | ○ | ○ |
| 4 | 330 | 313 | 333 | ○ | ○ |
| 5 | 321 | 311 | 331 | ○ | ○ |
| 6* | 313 | 313 | 334 | ○ | X |
| 7* | 305 | 312 | 332 | X | X |
| 8* | 295 | 310 | 330 | X | X |

*Comparative Example

Test Nos. 1 and 2 were evaluated to be poor in moisture resistance reliability, and it can be confirmed that heights Tc of the connection portions were greater than thicknesses T of the bodies, respectively. Test Nos. 6 to 8 were evaluated to be at least one poor in capacitance or moisture resistance reliability evaluation, and it can be confirmed that heights Tc of the connection portions were less than or equal to heights Ti of outermost layers of the internal electrodes, respectively.

In Test Nos. 3 to 5, heights Tc of the connection portions exceeded heights Ti of outermost layers of the internal electrodes, respectively, but were less than or equal to thicknesses T of the bodies, respectively. It can be confirmed that a change in capacitance to be targeted was maintained to be less than 10%, and there was no component in which defective occurs even in moisture resistance reliability.

Through this, it can be confirmed that reliability of a multilayer electronic component may be improved when $Ti<Tc\leq T$ was satisfied. It can be seen that, since the insulating layers cover the ends of the connection portions, respectively, reliability of the multilayer electronic component may be improved even when $Ti<Tc<Ts\leq T$ was satisfied.

TABLE 2

| Test No. | Width of Connection Portion Wc (μm) | Width of Internal Electrode Wi (μm) | Width of Body W (μm) | Capacitance (μF) | Moisture Reliability |
|---|---|---|---|---|---|
| 9* | 342 | 309 | 335 | ○ | X |
| 10* | 339 | 311 | 337 | ○ | X |
| 11 | 337 | 312 | 337 | ○ | ○ |
| 12 | 330 | 311 | 336 | ○ | ○ |
| 13 | 322 | 310 | 335 | ○ | ○ |
| 14 | 315 | 310 | 335 | ○ | ○ |
| 15* | 310 | 310 | 336 | ○ | X |
| 16* | 302 | 311 | 336 | X | X |

*Comparative Example

Test Nos. 9 and 10 were evaluated to be poor in moisture resistance reliability, and it can be confirmed that widths Wc of the connection portions were wider than widths W of the bodies, respectively. In addition, test Nos. and 16 were evaluated to be at least one poor in capacitance or moisture resistance reliability evaluation, and it can be confirmed that widths Wc of the connection portion were narrower than widths Wi of the internal electrodes, respectively.

In Test Nos. 11 to 14, widths Wc of the connection portions exceeded widths Wi of the internal electrodes, respectively, but were narrower than or equal to widths W of the bodies, respectively. It can be confirmed that a change in capacitance to be targeted was maintained to be less than 10%, and there was no component in which defective occurs even in moisture resistance reliability.

Through this, it can be confirmed that reliability of a multilayer electronic component may be improved when $Wi<Wc\leq W$ was satisfied. It can be seen that, since the insulating layers cover the ends of the connection portions, respectively, reliability of the multilayer electronic component may be improved even when $Wi<Wc<Ws\leq W$ was satisfied. One of several effects of the present disclosure are to control a height or a thickness of an external electrode to minimize external moisture penetration, to improve capacitance per unit volume of a multilayer electronic component, and to improve reliability of the multilayer electronic component.

One of the several effects of the present disclosure are to arrange an insulating layer on an external electrode to improve reliability of the multilayer electronic component, to further minimize external moisture penetration, and to absorb external impact.

However, various advantages and effects of the present disclosure are not limited to the above, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
   a body including a plurality of dielectric layers and first and second internal electrodes alternately disposed in a first direction with the plurality of dielectric layers interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
   a first external electrode including a first connection portion disposed on the third surface and connected to the first internal electrodes, and a first bend portion extending from the first connection portion to a portion of the first surface;
   a second external electrode including a second connection portion disposed on the fourth surface and connected to the second internal electrodes, and a second bend portion extending from the second connection portion to a portion of the first surface;
   a first insulating layer disposed on the first connection portion; and
   a second insulating layer disposed on the second connection portion,
   wherein the first and second connection portions are arranged to cover the first and second internal electrodes, respectively, and the first and second insulating layers are arranged to cover the first and second connection portions, respectively, and
   the multilayer electronic component satisfies the following relationship:
   $Ti<Tc<Ts\leq T$,
   where T denotes an average distance of the body in the first direction,
   Ti denotes an average distance, in the first direction, from the first surface to an internal electrode disposed closest to the second surface, among the first and second internal electrodes,
   Tc denotes an average distance, in the first direction, from the first surface to one ends of the first and second connection portions in the first direction, and
   Ts denotes an average distance, in the first direction, from the first surface to one ends of the first and second insulating layers in the first direction.

2. The multilayer electronic component of claim 1, wherein the first insulating layer is disposed between an extension line of an outer surface of the first bend portion and an extension line of the second surface, and the second insulating layer is disposed between an extension line of the second surface and an extension line of an outer surface of the second bend portion.

3. The multilayer electronic component of claim 1, wherein a main component of the first connection portion is different from a main component of the first bend portion, and a main component of the second connection portion is different from a main component of the second bend portion.

4. The multilayer electronic component of claim 1, wherein the first and second insulating layers comprise a resin.

5. The multilayer electronic component of claim 4, wherein the resin comprises at least one selected from an epoxy resin, an acrylic resin, ethyl cellulose, and a polymer resin.

6. The multilayer electronic component of claim 1, wherein the first and second insulating layers comprise at least one additive selected from $SiO_2$, $TiO_2$, $BaTiO_3$, BaO, $Al_2O_3$, and ZnO.

7. The multilayer electronic component of claim 1, wherein the body further comprises an active portion including the first and second internal electrodes alternately arranged with the plurality of dielectric layers in the first direction to form capacitance, a cover portion disposed on both end surfaces of the active portion in the first direction, and a margin portion disposed on both side surfaces of the active portion in the third direction.

8. The multilayer electronic component of claim 7, wherein an average distance of the cover portion in the first direction is 100 μm or less, and an average distance of the margin portion in the third direction is 80 μm or less.

9. A multilayer electronic component comprising:
a body including a plurality of dielectric layers and first and second internal electrodes alternately disposed in a first direction with the plurality of dielectric layers interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface and connected to the first internal electrodes, and a first bend portion extending from the first connection portion to a portion of the first surface;
a second external electrode including a second connection portion disposed on the fourth surface and connected to the second internal electrodes, and a second bend portion extending from the second connection portion to a portion of the first surface;
a first insulating layer disposed on the first connection portion; and
a second insulating layer disposed on the second connection portion,
wherein the first and second connection portions are arranged to cover the first and second internal electrodes, respectively, and the first and second insulating layers are arranged to cover the first and second connection portions, respectively, and
the multilayer electronic component satisfies the following relationships:
$Ti < Tc < Ts \leq T$ and $Wi < Wc < Ws \leq W$,
where T denotes an average distance of the body in the first direction,
W denotes an average distance of the body in the second direction,
Ti denotes an average distance, in the first direction, from the first surface to an internal electrode disposed closest to the second surface, among the first and second internal electrodes,
Wi denotes an average distance of each of the first and second internal electrodes in the second direction,
Tc denotes an average distance, in the first direction, from the first surface to one ends of the first and second connection portions in the first direction,
Wc denotes an average distance of each of the first and second connection portions in the second direction,
Ts denotes an average distance, in the first direction, from the first surface to one ends of the first and second insulating layers in the first direction, and
Ws denotes an average distance of each of the first and second insulating layers in the second direction.

10. The multilayer electronic component of claim 9, wherein the first insulating layer is disposed between an extension line of an outer surface of the first bend portion and an extension line of the second surface, and the second insulating layer is disposed between an extension line of the second surface and an extension line of an outer surface of the second bend portion.

11. The multilayer electronic component of claim 9, wherein a main component of the first connection portion is different from a main component of the first bend portion, and a main component of the second connection portion is different from a main component of the second bend portion.

12. The multilayer electronic component of claim 9, wherein the first and second insulating layers comprise a resin.

13. The multilayer electronic component of claim 12, wherein the resin comprises at least one selected from an epoxy resin, an acrylic resin, ethyl cellulose, and a polymer resin.

14. The multilayer electronic component of claim 9, wherein the first and second insulating layers comprise at least one additive selected from $SiO_2$, $TiO_2$, $BaTiO_3$, BaO, $Al_2O_3$, and ZnO.

15. The multilayer electronic component of claim 9, wherein the body further comprises an active portion including the first and second internal electrodes alternately arranged with the plurality of dielectric layers in the first direction to form capacitance, a cover portion disposed on both end surfaces of the active portion in the first direction, and a margin portion disposed on both side surfaces of the active portion in the third direction.

16. The multilayer electronic component of claim 15, wherein an average distance of the cover portion in the first direction is 100 μm or less, and an average distance of the margin portion in the third direction is 80 μm or less.

17. A multilayer electronic component comprising:
a body including a plurality of dielectric layers and first and second internal electrodes alternately disposed in a first direction with the plurality of dielectric layers interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface and connected to the first internal electrodes, and a first bend portion extending from the first connection portion to a portion of the first surface; and
a second external electrode including a second connection portion disposed on the fourth surface and connected to the second internal electrodes, and a second bend portion extending from the second connection portion to a portion of the first surface;
wherein the first and second connection portions covers the first and second internal electrodes, respectively,
the first connection portion is spaced apart from edges of the third surface respectively connected to the second, fifth, and sixth surfaces, and
the first connection portion has a width in the second direction greater than an average width of the first internal electrodes in the second direction.

18. The multilayer electronic component of claim 17, wherein a main component of the first connection portion is different from a main component of the first bend portion, and a main component of the second connection portion is different from a main component of the second bend portion.

19. The multilayer electronic component of claim 17, further comprising:
   a first insulating layer disposed on the first connection portion; and
   a second insulating layer disposed on the second connection portion.

20. The multilayer electronic component of claim 19, wherein among the first, second, third, fifth, and sixth surfaces of the body, the first insulating layer is disposed only on the third surface.

21. The multilayer electronic component of claim 19, wherein the first and second insulating layers comprise a resin.

22. The multilayer electronic component of claim 21, wherein the resin comprises at least one selected from an epoxy resin, an acrylic resin, ethyl cellulose, and a polymer resin.

23. The multilayer electronic component of claim 19, wherein the first and second insulating layers comprise at least one additive selected from $SiO_2$, $TiO_2$, $BaTiO_3$, BaO, $Al_2O_3$, and ZnO.

24. The multilayer electronic component of claim 19, wherein the first insulating layer is spaced apart from the edges of the third surface respectively connected to the second, fifth, and sixth surfaces.

* * * * *